United States Patent

Pickett et al.

[11] 3,826,141
[45] July 30, 1974

[54] TEMPERATURE INDICATOR

[75] Inventors: Charles G. Pickett, Andover; Desh D. Chadha, Dover, both of N.J.

[73] Assignee: Bio-Medical Sciences, Inc., Fairfield, N.J.

[22] Filed: Aug. 2, 1972

[21] Appl. No.: 277,065

Related U.S. Application Data

[62] Division of Ser. No. 120,891, March 4, 1971, Pat. No. 3,704,985.

[52] U.S. Cl..................... 73/356, 73/358, 252/408
[51] Int. Cl..................... G01k 11/08, G01k 11/12
[58] Field of Search.................. 73/358, 356, 17 R; 252/357, 408; 8/84

[56] References Cited
UNITED STATES PATENTS

| 3,175,401 | 3/1965 | Geldmacher | 73/358 |
| 3,243,303 | 3/1966 | Johnson | 73/356 |
| 3,430,491 | 3/1969 | Gignilliat | 73/358 |
| 3,561,262 | 2/1971 | Borucki | 73/104 |
| 3,665,770 | 5/1972 | Sagi et al. | 73/358 |

Primary Examiner—Richard C. Queisser
Assistant Examiner—Denis E. Corr
Attorney, Agent, or Firm—Bruce M. Collins

[57] ABSTRACT

Temperature indicators are provided comprising a heat-conductive carrier having at least one, but preferably a plurality of regions (cavities) thereon, each region containing a thermally responsive substance which undergoes a change of state at a precise and predetermined temperature different from the temperature of the change of state of the thermally responsive substance in any other region. The temperatures at which such changes of state occur are detected visually by an indicator system which is intimately associated with the thermally responsive materials in these regions. The incorporation of certain organic compounds into the indicator system accelerates visual detection of such change of state, thus permitting rapid measurement of the temperature corresponding to the incipient fusion of the thermally responsive material in each region.

5 Claims, 2 Drawing Figures

PATENTED JUL 30 1974    3,826,141

TEMPERATURE INDICATOR

This is a division of application Ser. No. 120,891 filed Mar. 4, 1971, now U.S. Pat. No. 3,704,985.

BACKGROUND OF INVENTION

1. Prior Art

Concurrently filed application of Robert A. Lang entitled "Disposable Type Thermometer" contains a rather detailed description of the prior art relating to the use of thermally responsive materials as temperature indicating compositions in the so-called "disposable" thermometers. For example, U.S. Pat. No. 3,175,401 issued Mar. 30, 1965 (D. E. Geldmacher) describes a temperature indicator in which the temperature indicator portion contains a plurality of spaced chambers each having a different temperature indicating composition. Upon change of states, these temperature indicating compositions change from opaque solids to translucent liquids thereby permitting visual observation of the background temperature. It must be emphasized, however, that such temperature measurement necessarily depends upon complete change of state of the composition in each corresponding chamber. Thus, they do not afford rapid and accurate temperature measurements and, frequently, such temperature measurements may be inaccurate by one degree Fahrenheit or more, depending upon the melting range of the temperature indicating composition in each chamber.

Other temperature indicators and compositions useful therein are described in other patents. See, e.g., U.S. Pat. No. 3,521,489 (Finkelstein et al.), issued July 21, 1970 and U.S. Pat. No. 3,465,590 (Kluth et al.), issued Sept. 9, 1969. However, as in U.S. Pat. No. 3,175,401, supra, visual detection of temperature in the temperature indicators described by these patents also depends upon complete change of state of the thermally responsive materials disclosed therein.

2. Summary of the Invention

The present invention contemplates providing thermally responsive materials useful for rapid and accurate measurement of temperature, e.g., the temperature of the human body or other test subjects.

In another aspect, the present invention is directed to temperature indicating compositions which undergo change of state rapidly and at a precise and predetermined temperature.

In one of its particular aspects, this invention is concerned with a temperature indicator comprising temperature indicating compositions where the temperatures of the incipient fusion of such compositions can be detected visually and accurately.

In one of its more specific aspect, the present invention is directed to the use of certain organic compounds (to be hereinafter defined) which, upon contact with the liquid resulting from the change of state of the temperature indicating composition, forms a eutectic mixture therewith, therby generating additional liquid and hence accelerating the visual detection of the desired temperature.

These and other aspects of the present invention will be more fully comprehended from the following detailed description of the invention taken in connection with the accompanying drawings. Throughout this description, the terms "thermally responsive material", "thermally responsive substance" and "temperature indicating composition" are used interchangeably to denote the same materials.

DESCRIPTION OF DRAWINGS

In the drawings appended hereto, where like numerals are employed to designate like parts:

Referring now to the drawings, FIG. 1 shows a thermometer 1 having a handle portion 3 and an indicator portion 5 which may be, for example, adapted for insertion into the human mouth for oral temperature measurement.

The indicator portion 5 contains a plurality of cavities or regions 7 adequately spaced on the indicator portion as shown in FIG. 1. Each cavity 7 is filled with a temperature indicating composition 9 having a different thermal characteristic than the composition in any other region. Thus, each region contains a temperature indicating composition having a melting point (incipient fusion temperature) which is different from the melting point of the composition in any other region. While FIG. 1 illustrates a plurality of regions 7, it must be understood that only one region may be employed in those instances where the temperature indicator is used for the purpose of apprising one of a single predetermined temperature or thermal state of the test subject.

Figure 2:
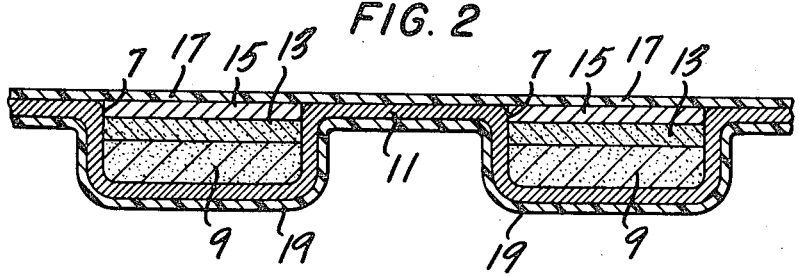
FIG. 2 is a vertical section taken along the line 2—2 of FIG. 1.

As is shown in FIG. 2, the thermometer 1 is comprised of a carrier sheet 11 containing the aforesaid cavities 7. Two such cavities are shown in exaggerated dimensions in order to facilitate understanding of this description.

The carrier sheet 11 is generally provided as sheet of flexible, heat-conductive material such as an aluminum foil. This will insure rapid heat transfer from the test subject to the temperature indicating compositions in said cavities. While aluminum foil is very convenient for this purpose, flexible, heat-conductive sheets of other materials such as, for example, copper, silver, gold, stainless steel or other heat-conductive pliable materials, can be employed with similar efficacy. Naturally the heat-conductive carrier sheet 11 must be a material which has a high thermal conductivity, relatively large surface area of contact with the test subject and must be of a minimum thickness, while preserving its structural integrity, in order to permit rapid conduction of heat into the thermally responsive substances in said cavities. Where aluminum foil is used as the carrier sheet, its thickness may vary from about 0.001 to about 0.004 mils. In any event, the selection of such heat-conductive carrier sheets is well within the knowledge of those skilled in the art and requires no additional elaboration.

Superimposed upon the temperature indicating composition and in intimate contact therewith, there is shown an indicator layer 13 and a masking layer 15 which overlies the indicator layer. The composite indicator layer-masking layer will hereinafter be referred to as the "indicator system" or "indicator means".

A transparent layer 17 such as, for example, polypropylene, Mylar, nitrocellulose, polyvinyl chloride, etc., is provided as a cover film coextensive with and attached to carrier sheet 11 sealably or by any other suitable means. Furthermore, in order to provide structural integrity to the thermometer and to avoid contact between the human mouth and the aluminum foil, the carrier sheet 11 is provided with an undercover layer 19 (usually of similar material as layer 17) which is coextensive with and overlies the lower surface of carrier sheet and conformally contours the aforesaid cavities. This undercover layer is usually adhesively attached to the carrier sheet.

The thickness of the undercover layer is generally in the order of from about 0.001 to about 0.003 mils in order to facilitate rapid heat transfer from the test subject to carrier sheet 11 and hence to the thermally responsive substances in the aforesaid cavities.

If desired, a heat-conductive metallic powder may be added to the undercover layer in order to improve its heat transfer characteristics. Powdered metallic aluminum has been found to be particularly satisfactory for this purpose.

Figure 1:
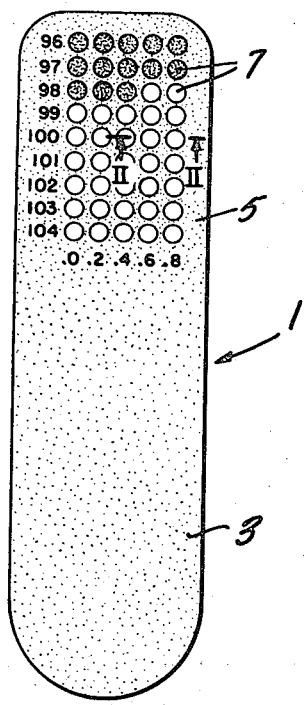
FIG. 1 is a plan view of a thermometer embodying the principles of this invention.

While FIGS. 1 and 2 depict the detailed construction of a thermometer of the type usefully employed herein, it can be readily appreciated that several structural modifications may be made therein without affecting their usefulness for the purpose of the present invention. For a more detailed description of other embodiments of this type of thermometer, reference may be made to the aforementioned concurrently filed application.

DESCRIPTION OF THE INVENTION

It has now been unexpectedly discovered that when certain organic compounds are incorporated into the indicator system, the visual detection of the desired temperature can be markedly accelerated. Since these compounds accelerate the visual detection of such temperature they will hereinafter be referred to as "accelerators."

It has also been unexpectedly discovered that upon change of state of the thermally responsive substance in each cavity, the liquid therefrom is absorbed by the indicator system and upon such absorption, and hence contact with the accelerator, a eutectic type mixture (hereinafter "eutectic mixture") is formed which consists of the thermally responsive substance and the accelerator. Accordingly, the melting temperature of the accelerator is considerably decreased thus resulting in the generation of additional liquid which facilitates visual detection of the temperature corresponding to the initial change of state of the thermally responsive substance, i.e., the incipient fusion temperature.

The term "eutectic mixture" as employed herein refers to a mixture of the accelerator and the thermally responsive substance which has a lower melting point than the melting points of any of its constituents.

It must be noted that in all prior art compositions, either complete change of state of the thermally responsive substance, or at least sufficient change of state is required to permit accurate temperature measurement. Accordingly, there is an inherent inaccuracy in such temperature measurement due to the time necessary to achieve the required amount in the change of state of these compositions.

The use of accelerators in accordance with this invention overcomes such inherent inaccuracies by substantially decreasing the time required for visual detection of the desired temperature since it affords visual detection corresponding essentially to the incipient fusion temperature of the thermally responsive materials in said cavities.

Compounds which have been found to be particularly useful as accelerators for the purpose of this invention are those which form eutectic mixtures having melting points lower than the melting point of the constituents of such mixtures. The thermally responsive substances employed herein are in the form of solid solution (as described in another concurrently filed application of Zsigmond Sagi and Berel Weinstein entitled "A Temperature Indicator") or as individual components having different thermal characteristics.

In addition, the accelerator must have a higher melting point than the highest temperature indicating composition which is employed. It has been found that as a practical matter the melting point of these accelerators must exceed the melting point of the highest melting temperature indicating composition by about 4° to about 15° F.

From the foregoing description it is apparent that the selection of the particular accelerator is, to a large extent, dictated by the choice of the thermal indicating composition which is employed. For example, when using a solid solution of ortho-chloronitrobenzene and ortho-bromonitrobenzene as the temperature indicating composition, dibenzyl succinate, phenyl salicylate and dibenzyl have been found to be particularly effective accelerators.

Thus, when dibenzyl succinate is employed as the accelerator in conjunction with a solid solution ortho-chloronitrobenzene and ortho-bromonitrobenzene, upon change of state of the solid solution and absorption of the resulting liquid by the indicator system, this liquid combines with dibenzyl succinate thereby forming a ternary eutectic mixture. Since the melting temperature of this eutectic mixture is lower than the melting temperature of any of its three constituents, additional liquid is therefore generated at the indicator system, thereby facilitating visual detection of this change.

While the accelerator may be incorporated into the indicator layer or in the masking layer, the advantages of this invention are particularly realized when the accelerator is incorporated into the masking layer. This has been found to afford temperature measurement within a high degree of accuracy, i.e., with 2/10 of a Fahrenheit degree, or even less, when used for temperature measurement in the clinical range.

The manner of addition of the accelerator to the masking layer will now be illustrated in connection with a system in which the thermally responsive substance is a solid solution of ortho-chloronitrobenzene and ortho-bromonitrobenzene and the accelerator is dibenzyl succinate.

A solution of 4 weight percent dibenzyl succinate in methanol was prepared by simple dissolution. The masking layer (a porous paper of the type generally used for cigarette manufacture) was then dipped into this solution for several seconds until saturated, and the solvent was then completely evaporated. The amount of the accelerator in the masking layer so produced was about 1/30th of the amount of the solid solution in each cavity.

Naturally the amount of the accelerator will vary depending upon the system employed and the type of masking layer. In all cases, however, this amount must exceed the minimum quantity required to facilitate the visual detection of the desired temperature.

As was previously described, the accelerators of this invention may be used in conjunction with the mixtures described by Kluth et al., supra, the solid solutions disclosed in the aforesaid concurrently filed application of Sagi and Weinstein, or in conjunction with single thermally responsive materials such as, e.g., those described in Geldmacher and Finkelstein et al., supra. When used in conjunction with a single thermally responsive substance, upon change of state of the latter, the liquid resulting from such change of state is absorbed by the indicator system as heretofore described. Upon contact with the accelerator, a binary eutectic is formed between the accelerator and the thermally responsive substance. Since the melting point of eutectic mixture is lower than the melting point of either of its constituents, additional liquid is generated at the indicator system, hence facilitating visual detection of the temperature essentially corresponding to the incipient fusion of the thermal indicating composition.

It may be appreciated, therefore, that the advantages of the present invention may be particularly realized when the aforesaid accelerators are used in conjunction with a single thermally responsive material. Frequently, the organic compounds which have heretofore been used as the temperature indicating compositions melt over a relatively wide temperature range, e.g., 2° Fahrenheit or more. See compounds listed in Column 2, of U.S. Pat. No. 3,175,401 (Geldmacher) and those listed in U.S. Pat. No. 3,521,189 (Finkelstein et al.), supra. By incorporating the accelerator into the masking layer in accordance with this invention, sufficient liquid is generated in the masking layer essentially at the temperature corresponding to the incipient fusion temperature of the thermally responsive substance in each cavity. This will facilitate visual observation of such temperature before complete change of state of the thermally responsive substance, or even before the change of state of sufficient amount of this material as described in the aforesaid, commonly assigned copending application.

The cavities may be filled with the thermally responsive substance by known means such as, for example, by metering predetermined quantities therein, or by any other suitable means adapted for mass production.

As was previously mentioned, the indicator system is a composite of an indicator layer and a masking layer. The indicator layer is usually a highly absorbant paper which has a high porosity and a high wick action in order to facilitate its wetting upon change of state of the thermally responsive materials in said cavities. This layer may be impregnated with a dye or a pigment to provide a color indication of such change of state.

The masking layer is ordinarily a paper having the same general properties as the indicator layer but which is of contrasting color. Thus, upon change of state of the thermally responsive substance in each cavity, the liquid is rapidly absorbed by the indicator layer and dissolves the dye or pigment therein. The resulting dye or pigment solution (or dispersion) migrates through the indicator layer into the masking layer thereby facilitating visual detection of the change in color of the masking layer.

Thus, as is shown in FIG. 1, if the temperature of the test subject is 98.6° F., all regions corresponding to temperatures of 96.0° to 98.6° F. will display a permanent change of color, while those regions corresponding to temperatures above 98.6° F. will not display any coloration. Accordingly, temperature measurements may be made irreversibly and the thermometer may be disposed of after a single use. However, in non-clinical applications, the thermometer may be employed for measuring temperatures higher than the previously registered temperature.

The dye or pigment employed may be incorporated into the indicator 15 or it may be added to the solid solution directly. When incorporated in the indicator layer, the latter may be simply dipped into the dye solution or into a dispersion of the pigment, or it may be sprayed or coated with such a solution or dispersion. Naturally sufficient amount of dye or pigment must be incorporated so as to facilitate rapid visual detection of the resulting color change.

If added directly to the solid solution, once again the amount of dye or pigment employed must be sufficient to permit rapid visual detection of the color change as aforesaid. However, the addition of a dye or a pigment directly to the solid solutions may, in some instances, adversely affect their melting ranges. Thus, in those instances where very accurate temperature measurements are required, i.e., within 2/10th of a Fahrenheit degree, the former method is preferable unless the dye or pigment selected for this purpose is known to have no adverse effects upon the accuracy of the melting point ranges of the solid solutions.

Whether the dye or pigment is added directly to the solid solution or incorporated into the indicator, it is advisable to prevent contact between the solid solution in said cavities and the indicator until the thermometer is actually in use. This prevents possible contamination of the solid solutions with the dye or the pigment. Thus, a separator layer (not shown) may be provided to prevent such contact and possible contamination. This separator may be pealably removed when the thermometer is ready for use. The details of construction of such a separator are described in the aforesaid concurrently filed application of Lang.

Generally, oil-soluble dyes which are compatible with the liquid resulting from change of state of the solid solutions in the aforesaid cavities have been found to be particularly suitable for incorporation into the indicator for use in the present invention.

In the case of pigments, it has been discovered that improved liquid absorption and color indication may be achieved by using pigments having particular sizes ranging from about 0.2 to about 0.5 microns, rather than using pigments with substantially larger particle sizes, e.g., one micron or greater. It must be pointed out, however, that the advantages of the present invention may be realized using any dye or pigment which will facilitate visual detection of the change of state of the solid solution in each cavity.

While the indicator means or system has heretofore been described with certain degrees of particularity in order to facilitate the understanding of this invention, it must be emphasized that this description is provided herein solely for the purpose of such understanding and is not intended to limit the scope of the present invention. Other indicator systems may be employed for the purpose of detecting the temperatures corresponding to changes of state of solid solutions. For a detailed description of such indicator systems, see the aforesaid concurrently filed application of Lang.

While the accelerators which have heretofore been discussed are those which form eutectic mixtures with the thermally responsive substances, it has also been discovered that visual detection of the desired temperature measurement may be accelerated by the addition of surfactants to the indicator system, or directly to the thermally responsive substance. While the various types of surfactants, i.e., cationic, non-ionic and anionic surfactants may be employed for the purpose of the present invention, the cationic surfactants, e.g., fatty acid nitrogen derivatives are preferred. When this type of surfactants is incorporated into the masking layer, for example, the rate of liquid absorption is markedly enhanced thereby accelerating the visual detection of any color change in the indicator system.

As was previously mentioned, non-ionic surfactants, e.g., polyethyleneoxy derivatives, and anionic surfactants, e.g., sodium salts of fatty acids and their esters may also be employed to enhance the rate of liquid absorption and spreading through the indicator system.

Furthermore, it has also been found that the addition of certain compounds to the indicator layer also facilitates visual detection of such color change. Thus, the addition, to the indicator layer, of compounds which react exothermically with the thermally responsive substance results in the generation of additional liquid which serves to accelerate the visual detection of the desired temperature. For example, alkaline compounds, such as, sodium hydroxide, etc., may be incorporated into the indicator when fatty acids (e.g., capric acids and lauric acid) are used as the thermally responsive substances. Upon change of state of these substances, the resulting liquid reacts with the alkaline compound in the indicator layer. This reaction is exothermic thus generating heat and, therefore, additional liquid, which accelerates the detection of the color change in the masking layer.

Naturally, different compounds can be used with different thermally responsive substances to effect such exothermic reactions.

While the use of the aforementioned temperature indicating compositions and accelerators have heretofore been illustrated in conjunction with thermometers for the purpose of temperature measurements, it must be pointed out that such illustration is not intended to be either exclusive or limiting. Thus, these temperature indicating compositions can be equally useful in other applications such as, e.g., pyrometers, and to detect overheating of transformers, motors and other similar electrical or mechanical appliances. Naturally for such applications, the temperature (or thermal) indicator system must be modified so that it may be adapted for use in such environments. Such modifications, however, are within the skill of the art and do not alter or affect the spirit of this invention. Nevertheless, it must be emphasized, that when used for the determination of temperature within the clinical range, the temperature indicating compositions can be employed to detect the temperature of the human body within 2/10th of a Fahrenheit degree or even less.

When used for clinical temperature determinations, it is recommended that the thermometer be inserted in the mouth in contact with the tongue for a period of from about 15 to about 40 seconds. The thermometer may then be removed and the temperature determined by observing the last region which has exhibited the aforesaid changes in color (See FIG. 1). While this time interval is generally satisfactory to achieve measurement of temperature within the desired accuracy, i.e., 2/10th of a Fahrenheit degree (or less), a period of about 15 seconds has generally been found to be adequate in most instances.

It must be further pointed out that while the aforesaid solid solutions have heretofore been described in connection with clinical thermometers for oral temperature measurement of the human body, such thermometers may also be employed for other temperature measurements. However, when used for other applications, the temperature scale will be slightly shifted, without, however, affecting the accuracy of the temperature readings. This is due to the difference in the prevailing environmental conditions which affects the rate of heat transfer from the test subject to the solid solutions. Thus, for example, when the clinical thermometer is used to measure the temperature of a liquid bath, the temperature scale will be shifted by 4/10th of a Fahrenheit degree for the entire clinical range. Thus, the region which would indicate a temperature of 99.4° F, when used for oral temperature measurement, will now measure a liquid bath temperature which is 99.0° F. Such calibrations and adjustments in temperature scale, however, may be made in advance for other such applications, without affecting the accuracy of the temperature measurements.

The invention that is claimed is:

1. In a temperature indicator comprising a heat conducting carrier sheet having a plurality of spaced regions defined therein, a like plurality of solid solutions of at least two organic compounds in varied composition ratios deposited in said regions, a single composition of said solid solutions being deposited in a single one of said regions, each of said solid solutions melting at a precise and predetermined temperature different from that at which the solid solution in any other region melts, and indicator means associated with the solid solutions deposited in each of said regions and operable to visually indicate the melting of any individual solid solution, the improvement comprising the incorporation of a surface-active agent selected from the group consisting of cationic, anionic and nonionic surfactants in said indicator means to accelerate said visual indication.

2. A temperature indicator as defined in claim 1 wherein said indicator means comprises (a) an indicator layer operable to receive said melted solid solution and impregnated with said surface active agent and a dye or pigment soluble in said solid solution and (b) an overlying absorbent layer masking, and having a color contrasting with, the color of the indicator layer but operable to assume the color of said indicator layer through absorption of melted solid solution carrying said dye or pigment.

3. A temperature indicator as defined in claim 2 wherein said solid solution is composed of ortho-chloronitrobenzene and ortho-bromonitrobenzene.

4. A temperature indicator as defined in claim 3 wherein said surface-active agent is a cationic surfactant.

5. A temperature indicator as defined in claim 4 wherein said cationic surfactant is a fatty acid nitrogen derivative.

* * * * *